United States Patent
D'Eletto

(10) Patent No.: US 10,187,280 B2
(45) Date of Patent: Jan. 22, 2019

(54) USING A TWO-WAY ACTIVE MEASUREMENT PROTOCOL TO CALCULATE ONE-WAY DELAY

(71) Applicant: Viavi Solutions Inc., Milpitas, CA (US)

(72) Inventor: Robert D'Eletto, Highlands Ranch, CO (US)

(73) Assignee: VIAVI Solutions Inc., San Jose, CA (US)

( * ) Notice: Subject to any disclaimer, the term of this patent is extended or adjusted under 35 U.S.C. 154(b) by 38 days.

(21) Appl. No.: 15/381,628

(22) Filed: Dec. 16, 2016

(65) Prior Publication Data
US 2017/0180108 A1    Jun. 22, 2017

Related U.S. Application Data

(60) Provisional application No. 62/269,306, filed on Dec. 18, 2015.

(51) Int. Cl.
*H04L 12/26* (2006.01)
*H04J 3/06* (2006.01)

(52) U.S. Cl.
CPC ........ *H04L 43/0858* (2013.01); *H04J 3/0667* (2013.01)

(58) Field of Classification Search
CPC .................................................. H04L 43/0858
See application file for complete search history.

(56) References Cited

U.S. PATENT DOCUMENTS

| | | | |
|---|---|---|---|
| 7,283,568 B2 | 10/2007 | Robie, Jr. et al. | |
| 8,792,380 B2 | 7/2014 | Hansson et al. | |
| 9,450,846 B1* | 9/2016 | Huang | H04L 43/0858 |
| 2009/0276542 A1* | 11/2009 | Aweya | H04J 3/0667 |
| | | | 709/248 |
| 2014/0056318 A1* | 2/2014 | Hansson | H04J 3/0667 |
| | | | 370/503 |
| 2014/0164668 A1* | 6/2014 | Charpentier | G06F 13/4027 |
| | | | 710/313 |
| 2014/0334311 A1* | 11/2014 | Wong | H04L 47/12 |
| | | | 370/236 |

(Continued)

OTHER PUBLICATIONS

Wikipedia, https://en.wikipedia.org/wiki/Precision_Time_Protocol, "Precision Time Protocol", Nov. 28, 2016, 7 pages.

(Continued)

*Primary Examiner* — Jason E Mattis
(74) *Attorney, Agent, or Firm* — Harrity & Harrity, LLP

(57) ABSTRACT

A sender device may receive timing information corresponding to a two-way active measurement protocol (TWAMP) exchange associated with a virtual clock and a reflector clock. The virtual clock may be maintained by the sender device and corresponding to the reflector clock. The reflector clock may be maintained by a reflector device. The sender device may determine, based on the timing information, an offset between the virtual clock and the reflector clock. The sender device may synchronize, based on the offset, the virtual clock with the reflector clock. The sender device may determine a one-way delay, associated with the sender device and the reflector device, using the virtual clock.

20 Claims, 7 Drawing Sheets

(56) References Cited

U.S. PATENT DOCUMENTS

2015/0023179 A1\* 1/2015 Stein .................. H04L 43/0811
  370/241.1
2017/0373950 A1\* 12/2017 Szilagyi ................ H04L 43/026

OTHER PUBLICATIONS

K. Hedayat et al., "A Two-Way Active Measurement Protocol (TWAMP)", RFC 5357, http://tools.ietf.org/html/rfc5357, Oct. 2008, 27 pages.

\* cited by examiner

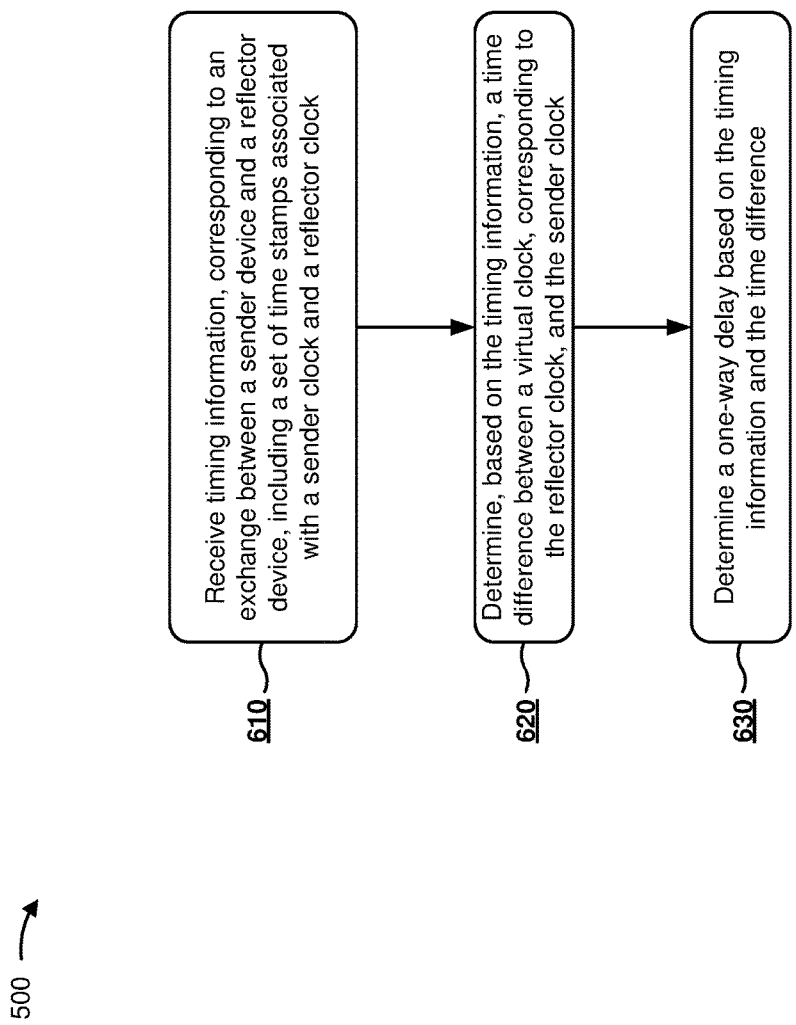

USING A TWO-WAY ACTIVE MEASUREMENT PROTOCOL TO CALCULATE ONE-WAY DELAY

RELATED APPLICATION

This application claims priority under 35 U.S.C. § 119 to U.S. Provisional Patent Application No. 62/269,306, filed on Dec. 18, 2015, the content of which is incorporated by reference herein in its entirety.

BACKGROUND

The Two-Way Active Measurement Protocol (TWAMP) is an open protocol for measuring network performance between any two devices supporting the TWAMP protocol. The TWAMP-control protocol is used to set up performance measurement sessions. The TWAMP-test protocol is used to send and receive performance measurement messages.

SUMMARY

According to some possible implementations, a method may include: receiving, by a sender device, timing information corresponding to a two-way active measurement protocol (TWAMP) exchange associated with a virtual clock and a reflector clock, where the virtual clock may be maintained by the sender device and corresponding to the reflector clock, and where the reflector clock may be maintained by a reflector device; determining, by the sender device and based on the timing information, an offset between the virtual clock and the reflector clock; synchronizing, by the sender device and based on the offset, the virtual clock with the reflector clock; and determining, by the sender device, a one-way delay, associated with the sender device and the reflector device, using the virtual clock.

According to some possible implementations, a first device may include one or more processors to: receive timing information corresponding to a two-way active measurement protocol (TWAMP) exchange associated with a first clock and a second clock, where the first clock may be maintained by the first device and may correspond to the second clock maintained by a second device; determine, based on the timing information, an offset between the first clock and the second clock; synchronize, based on the offset, the first clock with the second clock; and determine a one-way delay, associated with the first device and the second device, using the first clock.

According to some possible implementations, a non-transitory computer-readable medium may store instructions that, when executed by one or more processors, cause the one or more processors to: receive timing information corresponding to an exchange associated with a first clock and a second clock, where the first clock may be maintained by a first device and corresponding to the second clock, and where the second clock may be maintained by a second device; determine, based on the timing information, an offset between the first clock and the second clock; synchronize, based on the offset, the first clock with the second clock; and determine a one-way delay, associated with the first device and the second device, using the first clock and a third clock associated with the first device, where the third clock may be maintained by the first device and may correspond to the first device.

BRIEF DESCRIPTION OF THE DRAWINGS

FIG. 6 is a flow chart of an example process for determining a one-way delay based on a sender clock, maintained by a sender device, and a virtual clock maintained by the sender device.

DETAILED DESCRIPTION

Figure 1A:
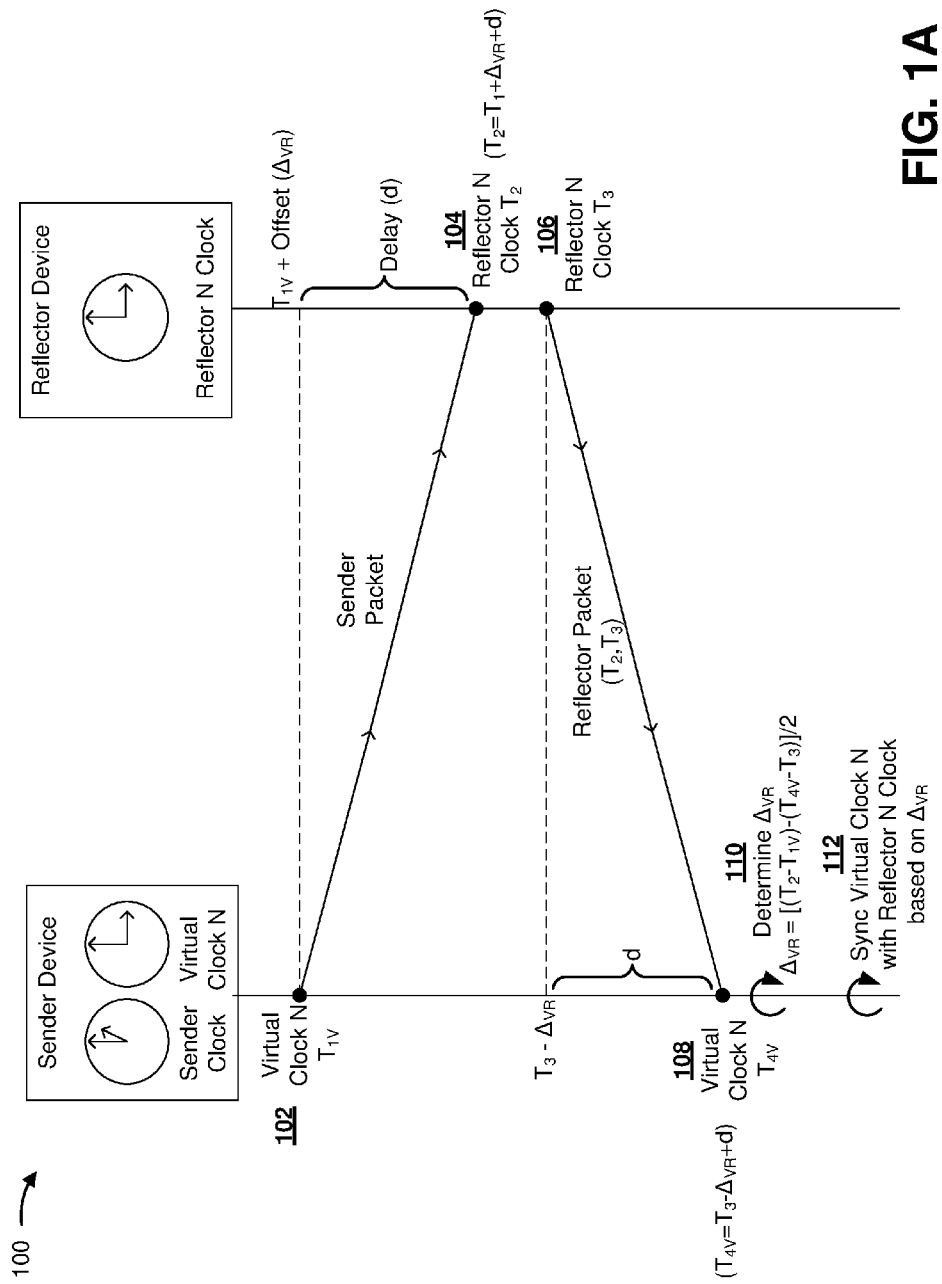
FIGS. 1A and 1B are diagrams of an overview of an example implementation described herein.

The following detailed description of example implementations refers to the accompanying drawings. The same reference numbers in different drawings may identify the same or similar elements.

Two-way active measurement protocol (TWAMP) may be used to determine a two-way delay (i.e., a round trip delay) between a pair of devices (e.g., a sender device and reflector device) included in a network. A typical TWAMP exchange between a sender device and a reflector device allows the sender device to determine timing information associated with communications between the sender device and the reflector device. For example, the timing information may include information that identifies a first time, according to a sender clock, at which the sender device sends a message to the reflector device (herein referred to as T1), a second time, according to a reflector clock, at which the reflector device receives the message (herein referred to as T2), a third time, according to the reflector clock, at which the reflector device sends a response to the message (herein referred to as T3), and a fourth time, according to the sender clock, at which the sender device receives the response (herein referred to as T4).

The sender device may use the timing information to determine a two-way (i.e., round trip, from the sender device to the reflector device and back to the sender device, etc.) delay associated with the sender device and the reflector device. For example, the sender device may determine the two-way delay using the following formula:

$$d_{SRS} = (T4-T1) - (T3-T2)$$

where $d_{SRS}$ corresponds to the two-way delay time, (T4−T1) corresponds to a total round trip time, and (T3−T2) corresponds to a processing time associated with the reflector device. The two-way delay time may be used as a metric for determining a performance level of the network. However, using TWAMP, the sender device may not be able to determine a one-way delay time (e.g., from the sender device to the reflector device, or from the reflector device to the sender device), which may be desired when determining the performance level of the network. However, as described in further detail below, the sender device may be capable of determining a one-way delay time based on techniques associated with precision time protocol (PTP).

PTP is a protocol associated with synchronizing clocks between devices (e.g., a master device and a slave device) in a network. In some implementations, PTP may allow the slave device (e.g., a device that is to synchronize a slave clock to a master clock) to determine the same four times as described above (e.g., T1, T2, T3, and T4) for use in synchronizing the slave clock to the master clock. For example, the slave device may determine a time difference between the slave clock and the master clock using the following formula:

$$\Delta_{SM}=[(T2-T1)-(T4-T3)]/2$$

where $\Delta_{SM}$ corresponds to the time difference between the slave clock and the master clock, where (T2−T1) corresponds to a time difference between the time, according to the slave clock, at which the slave device receives a message and a time, according to the master clock, at which the master device sends the message, and where (T4−T3) corresponds to a time difference between the time, according to the master clock, at which the master device receives a response to the message and a time, according to the slave clock, at which the slave device sends the response to the message. In the case of PTP, the slave device may, based on the difference, increase or decrease a speed of the slave clock in order to synchronize with the master clock.

Implementations described herein may allow a sender device to use timing information, determined via a TWAMP exchange, to synchronize a virtual clock, associated with a reflector device (e.g., using a PTP-based technique), in order to determine one or more one-way delays, associated with the reflector device, without synchronizing a reflector clock maintained by the reflector device. In this way, the sender device may readily determine one or more one-way delay times for use in determining a performance level of the network, based on a TWAMP exchange, without a need to synchronize the reflector clock.

Figure 1B:
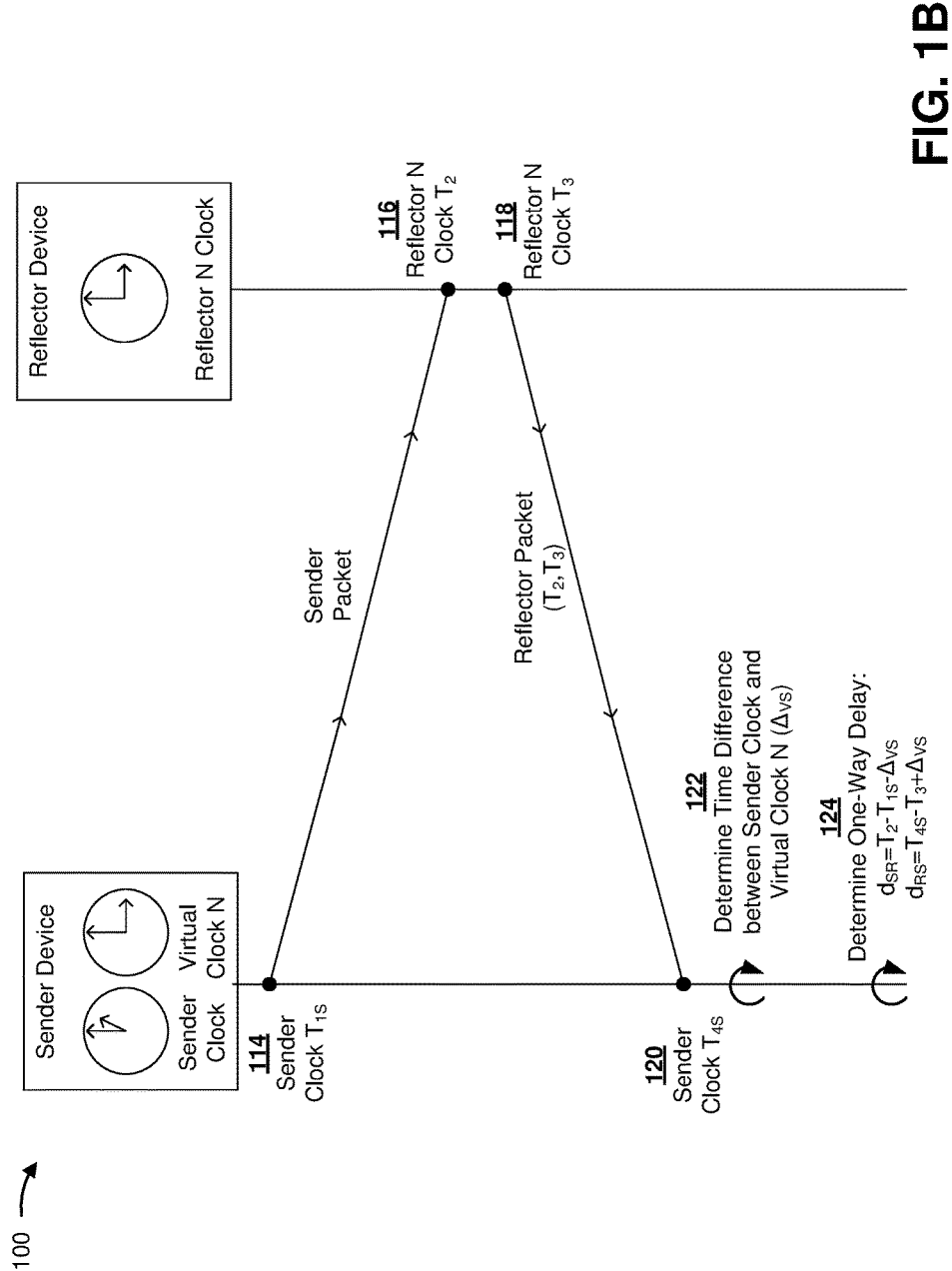

FIGS. 1A and 1B are diagrams of an overview of an example implementation 100 described herein. As shown in FIG. 1A, example implementation 100 may include a sender device (referred to herein as a sender), and may include a reflector device N (referred to herein as a reflector N). The reflector N may maintain a reflector N clock representing a time at the reflector N. The sender may maintain a sender clock representing a time at the sender, and may also maintain a virtual clock N corresponding to the reflector N clock.

As shown by reference number 102, the sender may send a packet to the reflector N at time T1V of virtual clock N. As shown by reference number 104, the reflector N may receive the packet at time T2 of the reflector N clock. Here, T2 is equal to T1V plus an offset $\Delta_{VR}$ (e.g., a time difference between the virtual clock N and the reflector N clock) and a delay d (e.g., an amount of time between transmittal of the packet by the sender and receipt of the packet by the reflector).

As shown by reference number 106, the reflector may send a response to the packet at time T3 of the reflector N clock. As shown by reference number 108, the sender may receive the response at time T4V of the virtual clock N. Here, T4V is equal to T3 minus the offset $\Delta_{VR}$ and plus the delay d (e.g., when the delay is assumed to be identical in both directions).

As shown by reference number 110, the sender may determine the offset between the virtual clock N and the reflector N clock. For example, the sender may determine the offset based on a difference between a sender to reflector N measurement associated with the packet (T2−T1V), and a reflector N to sender measurement associated with the response (T4V−T3), and dividing the difference by two. The result is the offset for a single transmission (e.g., sender to reflector N or reflector N to sender).

As shown by reference number 112, the sender may synchronize the virtual clock N with the reflector N clock based on the offset. For example, the sender may increase or decrease a speed of the virtual clock N in order to cause the virtual clock N to match the reflector N clock. In some implementations, the sender may repeatedly perform this process in order to continuously synchronize the virtual clock N with the reflector N clock. Notably, synchronization of the reflector N clock (e.g., to match the sender clock) is not required. In some implementations, the virtual clock N, corresponding to the reflector N clock, may be used to determine a one-way delay, an example of which is described below with regard to FIG. 1B.

As shown in FIG. 1B, and as shown by reference number 114, the sender may (e.g., at a later time) send a packet to the reflector N at time T1S of a sender clock. As shown by reference number 116, the reflector N may receive the packet at time T2 of the reflector N clock. As shown by reference number 118, the reflector N may send a response to the packet at time T3 of the reflector N clock. As shown by reference number 120, the sender may receive the response at time T4S of the sender clock.

As shown by reference number 122, the sender may determine a time difference between the sender clock and the virtual clock N corresponding to the reflector N clock (i.e., the virtual clock, maintained by the sender, that is synchronized with the reflector N clock). As shown by reference number 124, the sender may determine one or more one-way delays (e.g., sender to reflector N, reflector N to sender) based on the time difference and the timing information.

For example, the sender may determine a one-way delay for a sender to reflector N transmission ($d_{SR}$) by subtracting the determined time difference $\Delta_{VS}$ from a sender to reflector N measurement associated with the packet (T2−T1S). Similarly, the sender may determine a one-way delay for a reflector N to sender transmission ($d_{RS}$) by subtracting the determined time difference $\Delta_{VS}$ from a reflector N to sender measurement associated with the response (T4S−T3).

In this way, the sender device may readily determine one or more one-way delay times for use in determining a performance level of the network, based on a TWAMP exchange, without a need to synchronize the reflector clock. As a result, processor resources of the reflector device may be conserved, and components or devices that depend on the reflector device may rely on consistency of the reflector device clock.

As indicated above, FIGS. 1A and 1B are provided merely as examples. Other examples are possible and may differ from what was described with regard to FIGS. 1A and 1B.

Figure 2:
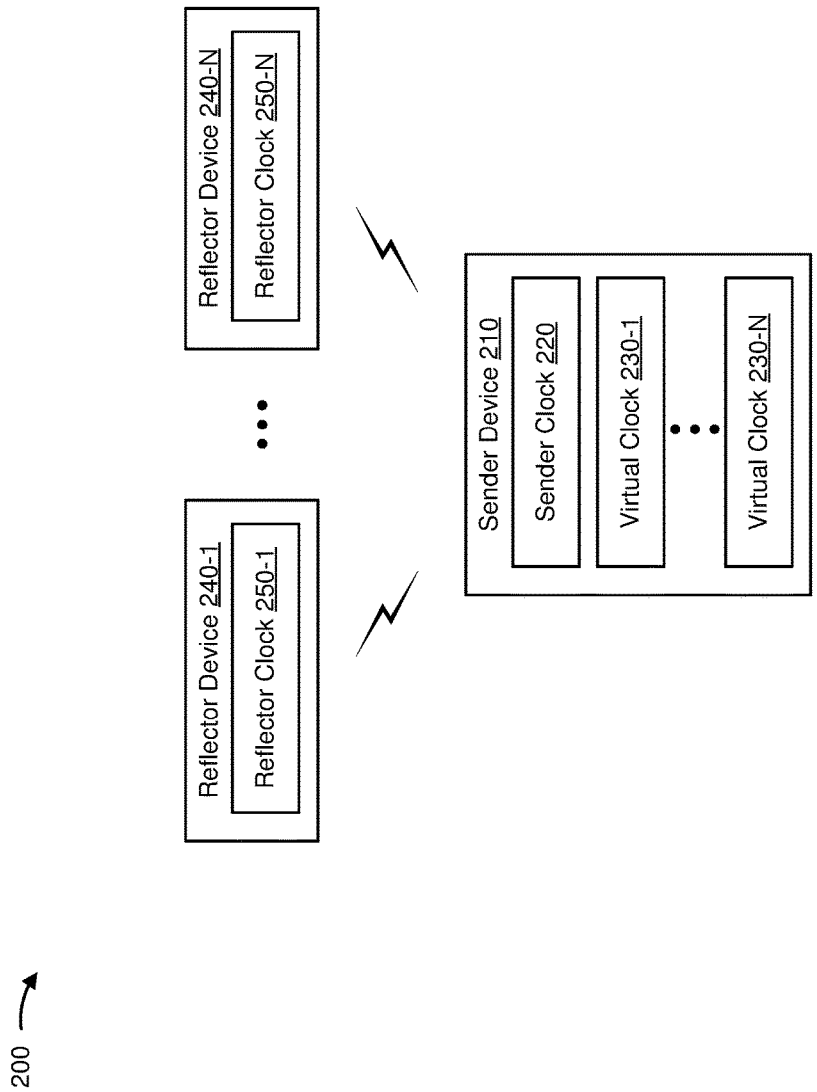
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a sender device 210 that maintains a sender clock 220 and one or more virtual clocks 230-1 through 230-N (N≥1) (hereinafter referred to collectively as virtual clocks 230, and individually as virtual clock 230). As further shown, environment 200 may also include one or more reflector devices 240-1 through 240-N (hereinafter referred to collectively as reflector devices 240, and individually as reflector device 240) that maintain corresponding reflector clocks 250 (e.g., reflector clock 250-1 through 250-N).

Sender device 210 may include a device capable of maintaining sender clock 220 and one or more virtual clocks 230. For example, sender device 210 may include a server, a group of servers, a network device such as a router, a gateway, a switch, a server, a modem, a network interface card (NIC), a hub, a bridge, an optical add-drop multiplexer (OADM), or the like. In some implementations, sender device 210 may be capable of determining timing information via a TWAMP exchange. Sender clock 220 may include a clock, maintained by sender device 210 that corresponds to sender device 210.

Virtual clock 230 may include a clock, maintained by sender device 210, that corresponds to reflector clock 250 maintained by reflector device 240. In some implementations, sender device 210 may maintain multiple virtual clocks 230 that correspond to multiple reflector clocks 250 maintained by multiple reflector devices 240. Additional details regarding virtual clock 230 are described below with regard to FIG. 4.

Reflector device 240 may include a device capable of maintaining reflector clock 250. For example, reflector device 240 may include a server, a group of servers, a network device such as a router, a gateway, a switch, a server, a modem, a NIC, a hub, a bridge, an OADM, or the like. In some implementations, reflector device 240 may be capable of providing a response to a TWAMP message during a TWAMP exchange. Reflector clock 250 may include a clock, maintained by reflector device 240, that corresponds to reflector device 240.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
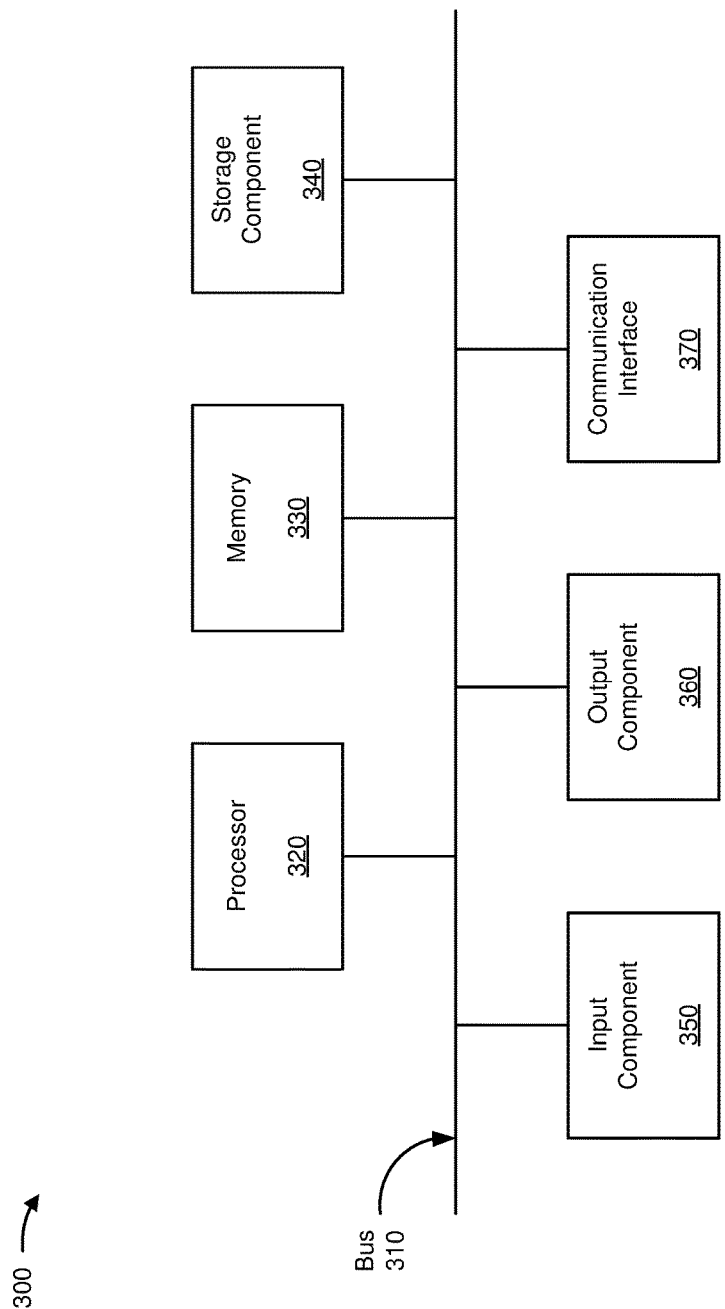
FIG. 3 is a diagram of example components of one or more devices of FIG. 2.

FIG. 3 is a diagram of example components of a device 300. Device 300 may correspond to sender device 210 and/or reflector device 240. In some implementations, sender device 210 and/or reflector device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
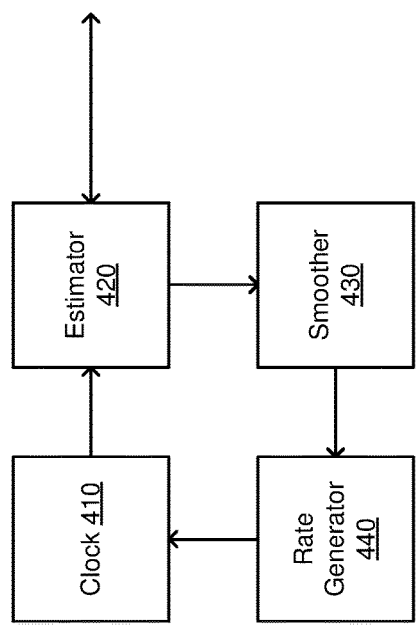
FIG. 4 is a diagram of example functional components of a virtual clock of FIG. 2.

FIG. 4 is a diagram of example functional components of virtual clock 230. As shown in FIG. 4, virtual clock 230 may include a clock 410, an estimator 420, a smoother 430, and a rate generator 440. In some implementations, clock 410, estimator 420, smoother 430, and rate generator 440 are implemented in software that is executed on hardware, such as by a processor, implemented in firmware, or implemented in hardware.

Clock 410 may include a clock maintained by sender device 210, that corresponds to reflector clock 250. For example, clock 410 may include a clock driven by an oscillator. In some implementations, clock 410 may be modified such that clock 410 is synchronized (i.e., matches) reflector clock 250. For example, a speed of clock 410 may be increased or decreased based on an offset between clock 410 and reflector clock 250, such that clock 410 matches reflector clock 250. In some implementations, clock 410 may be modified based on information provided by rate generator 440, as described below. Additionally, or alternatively, clock 410 may provide information (e.g., a reference time) to estimator 420.

Estimator 420 may include a functional component capable of determining an offset between reflector clock 250 and clock 410. For example, estimator 420 may determine an offset between reflector clock 250 and clock 410 in the manner described herein. In some implementations, estimator 420 may (e.g., periodically, such as every second, ten times per second, or the like) determine and provide information that identifies an offset to smoother 430.

Smoother 430 may include a functional component capable of regulating correction of clock 410. For example, smoother 430 may include a digital filter capable of reducing and/or removing jitter in offset estimates provided by estimator 420. In some implementations, smoother 430 may provide a filtered (i.e., smoothed) offset to rate generator 440.

Rate generator 440 may include a functional component capable of signaling clock 410 in order to increase or decrease the speed of clock 410. For example, rate generator 440 may receive the smoothed offset from smoother 430, may determine that the speed of clock 410 should increase or decrease in order to match reflector clock 250, and may provide, to clock 410, clock correction information associated with increasing or decreasing the speed, accordingly.

The number and arrangement of functional components shown in FIG. 4 are provided as an example. In practice, virtual clock 230 may include additional functional components, fewer functional components, different functional components, or differently arranged functional components than those shown in FIG. 4. Additionally, or alternatively, a set of functional components (e.g., one or more functional components) of virtual clock 230 may perform one or more functions described as being performed by another set of functional components of virtual clock 230.

Figure 5:
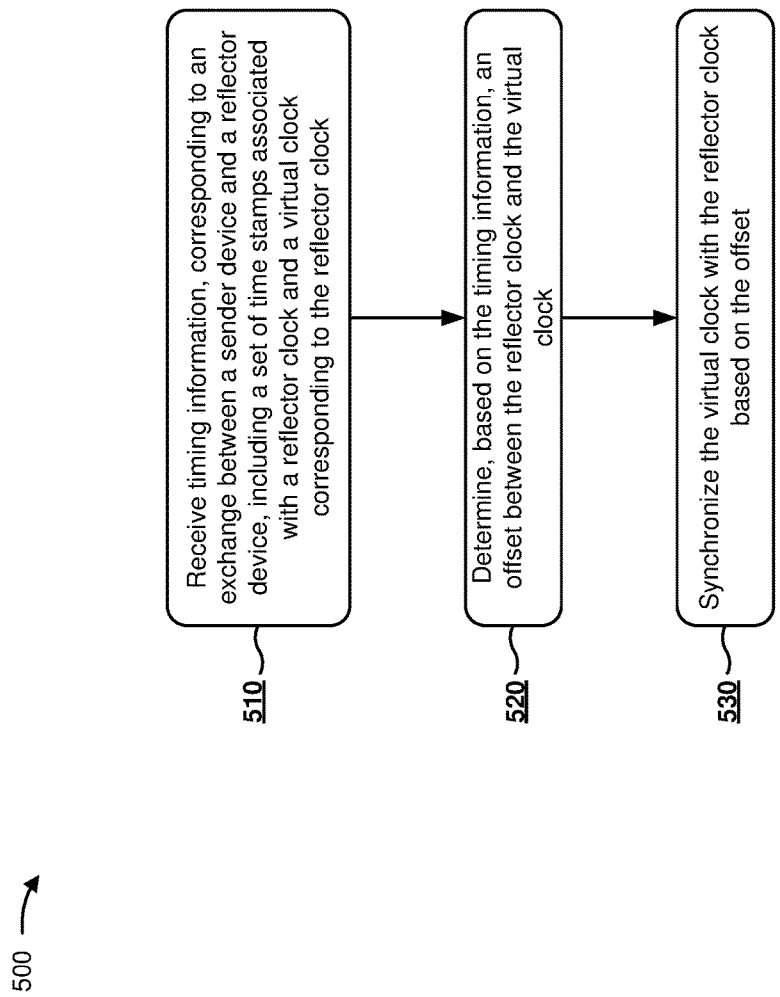
FIG. 5 is a flow chart of an example process for synchronizing a virtual clock, maintained by a sender device, with a reflector clock maintained by a reflector device.

FIG. 5 is a flow chart of an example process 500 for synchronizing virtual clock 230, maintained by sender device 210, with reflector clock 250 maintained by reflector device 240. In some implementations, one or more process blocks of FIG. 5 may be performed by sender device 210.

As shown in FIG. 5, process 500 may include receiving timing information, corresponding to an exchange between a sender device and a reflector device, including a set of time stamps associated with a reflector clock and a virtual clock corresponding to the reflector clock (block 510). For example, sender device 210 may receive timing information corresponding to an exchange between sender device 210 and a reflector device 240. The timing information may include a set of time stamps associated with a reflector clock 250 and associated with a virtual clock 230 corresponding to the reflector clock 250.

In some implementations, the timing information may include information associated with an exchange between sender device 210 and reflector device 240. For example, the timing information may include timing information (e.g., a set of time stamps) associated with a TWAMP exchange between sender device 210 and reflector device 240.

In some implementations, the timing information may include timing information corresponding to virtual clock 230 (maintained by sender device 210) and reflector clock 250 (maintained by reflector device 240). For example, the timing information may include information that identifies a time, according to virtual clock 230, at which sender device 210 sends a packet (T1V). The timing information may further include a time, according to reflector clock 250, at which reflector device 240 receives the packet (T2). The timing information may further include a time, according to reflector clock 250, at which reflector device 240 sends a response to the packet (T3). The timing information may further include a time, according to virtual clock 230, at which sender device 210 receives the response (T4V).

Additionally, or alternatively, the timing information may include timing information corresponding to sender clock 220 maintained by sender device 210. For example, the timing information may include information that identifies a time, according to sender clock 220, at which sender device 210 sends a packet (T1S), and a time, according to sender clock 220, at which sender device 210 receives the response (T4S).

In some implementations, sender device 210 may receive the timing information based on sender device 210 sending a packet associated with a TWAMP exchange and/or receiving a packet associated with the TWAMP exchange. In other words, sender device 210 may receive the timing information as a result of a TWAMP exchange initiated by sender device 210.

As further shown in FIG. 5, process 500 may include determining, based on the timing information, an offset between the reflector clock and the virtual clock (block 520). For example, sender device 210 may determine an offset between reflector clock 250 and virtual clock 230.

In some implementations, the offset may include information that identifies a time difference between virtual clock 230 and reflector clock 250. In some implementations, sender device 210 (e.g., estimator 420) may determine the offset when sender device 210 receives the timing information.

In some implementations, sender device 210 may determine the offset based on the timing information. For example, sender device 210 may determine the offset as follows:

$$\Delta_{VR}=[(T2-T1V)-(T4V-T3)]/2$$

where $\Delta_{VR}$ corresponds to the offset between virtual clock 230 and reflector clock 250.

In some implementations, sender device 210 may determine the offset periodically (e.g., every second, ten times per second, or the like), such as when a TWAMP exchange takes place on a periodic basis. In this way, sender device 210 may repeatedly update the offset in order to ensure proper synchronization between virtual clock 230 and reflector clock 250, as described below.

As further shown in FIG. 5, process 500 may include synchronizing the virtual clock with the reflector clock based on the offset (block 530). For example, sender device 210 may synchronize virtual clock 230 with reflector clock 250. In some implementations, sender device 210 may synchronize virtual clock 230 when sender device 210 determines the offset.

In some implementations, sender device 210 may synchronize virtual clock 230 based on the offset. For example, sender device 210 may determine the offset, as described above. Next, sender device 210 (e.g., smoother 430) may filter the offset to create a filtered offset. Here, sender device 210 may reduce and/or remove jitter in the offset in order to create a filtered (i.e., smoothed) offset to be used for synchronizing virtual clock 230 with reflector clock 250.

In this case, sender device 210 may filter the offset based on one or more previous offsets (e.g., determined based on earlier TWAMP exchanges). For example, sender device 210 may provide, as input to an algorithm, information associated with the offset and information associated with the one or more previous offsets, and may receive, as output, the filtered offset. In some implementations, the filtered offset may be a combination (e.g., an average, a weighted average, etc.) of the offset and the one or more previous offsets. In this way, sender device 210 may prevent an anomalous offset from significantly impacting the synchronization of virtual clock 230 with reflector clock 250. In some implementations, sender device 210 may filter the offset repeatedly (e.g., each time sender device 210 determines another offset).

Next, sender device 210 (e.g., rate generator 440) may determine, based on the filtered offset, correction information associated with synchronizing virtual clock 230 with reflector clock 250. In some implementations, the correction information may include information associated with synchronizing virtual clock 230 with reflector clock 250 such that a time of virtual clock 230 matches a time of reflector clock 250.

For example, the correction information may include information indicating that a speed of clock 410 is to increase when, for example, the offset indicates that a time of virtual clock 230 is behind a time of reflector clock 250. As another example, the correction information may include information indicating that a speed of clock 410 is to decrease when, for example, the offset indicates that a time of virtual clock 230 is ahead of a time of reflector clock 250.

As another example, the correction information may include information that causes a time of clock 410 to change by a particular amount (e.g., such the time of virtual clock 230 matches the time of reflector clock 250).

Next, sender device 210 (e.g., rate generator 440) may synchronize virtual clock 230 with reflector clock 250 based on the correction information. For example, sender device 210 (e.g., via signaling from rate generator 440 to clock 410) may increase or decrease a clock speed of virtual clock 230 (e.g., corresponding to clock 410) based on the correction information.

In some implementations, sender device 210 may repeatedly synchronize virtual clock 230 and reflector clock 250 (e.g., each time sender device 210 determines an offset), such that sender device 210 repeatedly updates, modifies, and/or changes the clock speed in order to synchronize virtual clock 230 with reflector clock 250.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for determining a one-way delay based on sender clock 220, maintained by sender device 210, and virtual clock 230 maintained by sender device 210. In some implementations, one or more process blocks of FIG. 6 may be performed by sender device 210.

As shown in FIG. 6, process 600 may include receiving timing information, corresponding to an exchange between a sender device and a reflector device, including a set of time stamps associated with a sender clock and a reflector clock (block 610). For example, sender device 210 may receive timing information corresponding to an exchange between sender device 210 and a reflector device 240. The timing information may include a set of time stamps associated with sender clock 220 and associated a reflector clock 250.

As described above, the timing information may include information associated with an exchange between sender device 210 and reflector device 240. For example, the timing information may include timing information (e.g., a set of time stamps) associated with a TWAMP exchange between sender device 210 and reflector device 240.

In some implementations, as described above, the timing information may include timing information corresponding to sender clock 220 maintained by sender device 210. For example, the timing information may include information that identifies a time, according to sender clock 220, at which sender device 210 sends a packet (T1S). The timing information may further include a time, according to reflector clock 250, at which reflector device 240 receives the packet (T2). The timing information may further include a time, according to reflector clock 250, at which reflector device 240 sends a response to the packet (T3). The timing information may further include a time, according to sender clock 220, at which sender device 210 receives the response (T4S).

Additionally, or alternatively, as described above, the timing information may include timing information corresponding to virtual clock 230 (maintained by sender device 210), and timing information corresponding to reflector clock 250 (maintained by reflector device 240). For example, the timing information may include information that identifies a time, according to virtual clock 230, at which sender device 210 sends a packet (T1V), and a time, according to virtual clock 230, at which sender device 210 receives the response (T4V).

In some implementations, sender device 210 may receive the timing information based on sender device 210 sending a packet associated with a TWAMP exchange and/or receiving a packet associated with the TWAMP exchange. In other words, sender device 210 may receive the timing information as a result of a TWAMP exchange initiated by sender device 210.

As further shown in FIG. 6, process 600 may include determining, based on the timing information, a time difference between a virtual clock, corresponding to the reflector clock, and the sender clock (block 620). For example, sender device 210 may determine a time difference between a virtual clock 230 (corresponding to a reflector clock 250) and sender clock 220. In some implementations, sender device 210 may determine the time difference when sender device 210 receives the timing information. In some implementations, receipt of the timing information may trigger sender device 210 to determine the time difference.

In some implementations, sender device 210 may determine the time difference based on a time of sender clock 220 and a time of a virtual clock 230 that corresponds to the reflector device 240 that is associated with the TWAMP exchange. For example, sender device 210 may determine a time of sender clock 220 and a time of virtual clock 230 at a given instant of time, and may determine the time difference accordingly (e.g., based on subtracting the time of sender clock 220 from the time of virtual clock 230). Notably, sender device 210 may determine the time difference based on the virtual clock 230 that is synchronized with reflector clock 250 (e.g., rather than based on reflector clock 250 itself).

As further shown in FIG. 6, process 600 may include determining a one-way delay based on the timing information and the time difference (block 630). For example, sender device 210 may determine a one-way delay based on the timing information and the time difference. In some implementations, sender device 210 may determine the one-way delay when sender device 210 determines the time difference between sender clock 220 and virtual clock 230.

In some implementations, sender device 210 may determine the one-way delay based on the timing information and the time difference. For example, sender device 210 may determine the one-way delay as follows:

$$d_{SR}=T2-T1S-\Delta_{VS}$$

$$d_{RS}=T4S-T3+\Delta_{VS}$$

where $d_{SR}$ corresponds to a one-way delay from sender device 210 to reflector device 240, $\Delta_{VS}$ corresponds to the timing difference between virtual clock 230 and sender clock 220, and $d_{RS}$ corresponds to a delay from reflector device 240 to sender device 210. Notably, sender device 210 may determine the one or more one-way delays without synchronizing reflector clock 250. That is, sender device 210 may determine the one-way delays using virtual clock 230 that corresponds to reflector clock 250, thereby conserving processor resources and/or network resources that may otherwise be consumed during synchronization of reflector clock 250.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Implementations described herein may allow a sender device to use timing information, determined via a TWAMP exchange, to synchronize a virtual clock, associated with a reflector device (e.g., using a PTP-based technique), in order to determine one or more one-way delays, associated with the reflector device, without synchronizing a reflector clock maintained by the reflector device. In this way, the sender device may readily determine one or more one-way delay times for use in determining a performance level of the network, based on a TWAMP exchange, without a need to synchronize the reflector clock.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a sender device, timing information corresponding to a two-way active measurement protocol (TWAMP) exchange associated with a virtual clock and a reflector clock,
      the virtual clock being maintained by the sender device and corresponding to the reflector clock, and
      the reflector clock being maintained by a reflector device;
   determining, by the sender device and based on the timing information, an offset between the virtual clock and the reflector clock;
   synchronizing, by the sender device and based on the offset, the virtual clock with the reflector clock;
   receiving, by the sender device, additional timing information corresponding to a TWAMP exchange associated with the reflector clock and a sender clock,
      the sender clock being maintained by the sender device and corresponding to the sender device;
   determining, by the sender device, a timing difference between the virtual clock and the sender clock; and
   determining, by the sender device, a one-way delay, associated with the sender device and the reflector device, based on the additional timing information and the timing difference.

2. The method of claim 1, where the timing information includes information that identifies at least one of:
   a time, according to the virtual clock, at which the sender device sends a message to the reflector device;
   a time, according to the reflector clock, at which the reflector device receives the message;
   a time, according to the reflector clock, at which the reflector device sends a response to the message; or
   a time, according to the virtual clock, at which the sender device receives the response.

3. The method of claim 1, further comprising:
   determining a first amount of time that identifies a difference between a time, according to the reflector clock, at which the reflector device receives a message from the sender device, and a time, according to the virtual clock, at which the sender device sends the message to the reflector device;
   determining a second amount of time that identifies a difference between a time, according to the virtual clock, at which the sender device receives a response to the message, and a time, according to the reflector clock, at which the reflector device sends the response to the message;
   determining a third amount of time based on a difference between the first amount of time and the second amount of time;
   halving the third amount of time; and where determining the offset comprises:
  determining the offset based on a result of halving the third amount of time.
4. The method of claim 1, further comprising:
  filtering the offset to create a filtered offset;
  determining, based on the filtered offset, correction information associated with correcting the virtual clock; and
  where synchronizing the virtual clock comprises:
    synchronizing the virtual clock based on the correction information.
5. The method of claim 4, where the correction information includes information indicating that a speed of the virtual clock is to be increased or decreased,
  the speed of the virtual clock being increased or decreased to cause the virtual clock to be synchronized with the reflector clock.
6. The method of claim 1,
  where the additional timing information includes information that identifies a time, according to the reflector clock, at which the reflector device receives a message from the sender device, and a time, according to the sender clock, at which the sender device sends the message to the reflector device.
7. The method of claim 1,
  where the additional timing information includes information that identifies a time, according to the sender clock, at which the sender device receives a response to a message, and a time, according to the reflector clock, at which the reflector device sends the response to the message.
8. A first device, comprising:
  one or more processors to:
    receive timing information corresponding to a two-way active measurement protocol (TWAMP) exchange associated with a first clock and a second clock,
      the first clock being maintained by the first device and corresponding to the second clock maintained by a second device;
    determine, based on the timing information, an offset between the first clock and the second clock;
    synchronize, based on the offset, the first clock with the second clock;
    receive additional timing information corresponding to a TWAMP exchange associated with the second clock and a third clock,
      the third clock being maintained by the first device and corresponding to the first device;
    determining, by the first device, a timing difference between the first clock and the third clock; and
    determine a one-way delay, associated with the first device and the second device, based on the additional timing information and the timing difference.
9. The first device of claim 8, where the timing information includes information that identifies at least one of:
  a time, according to the first clock, at which the first device sends a message to the second device;
  a time, according to the second clock, at which the second device receives the message;
  a time, according to the second clock, at which the second device sends a response to the message; or
  a time, according to the first clock, at which the first device receives the response.
10. The first device of claim 8, where the one or more processors are further to:
  determine a first amount of time that identifies a difference between a time, according to the second clock, at which the second device receives a message from the first device, and a time, according to the first clock, at which the first device sends the message to the second device;
  determine a second amount of time that identifies a difference between a time, according to the first clock, at which the first device receives a response to the message, and a time, according to the second clock, at which the second device sends the response to the message; and
  where the one or more processors, when determining the offset, are to:
    determine the offset based on a difference between the first amount of time and the second amount of time.
11. The first device of claim 8, where the one or more processors are further to:
  determine, based on the offset, correction information associated with correcting the first clock,
    the correction information including information indicating that a speed of the first clock is to be increased or decreased to cause the first clock; and
  where the one or more processors, when synchronizing the first clock, are to:
    synchronize the first clock based on the correction information.
12. The first device of claim 8, where the one or more processors are further to:
  filter the offset based on one or more previous offsets to create a filtered offset; and
  where the one or more processors, when synchronizing the first clock, are to:
    synchronize the first clock based on the filtered offset.
13. The first device of claim 8,
  where the additional timing information includes information that identifies a time, according to the second clock, at which the second device receives a message from the first device, and a time, according to the third clock, at which the first device sends the message to the second device.
14. The first device of claim 8,
  where the additional timing information includes information that identifies a time, according to the third clock, at which the first device receives a response to a message, and a time, according to the second clock, at which the second device sends the response to the message.
15. A non-transitory computer-readable medium storing instructions, the instructions comprising:
  one or more instructions that, when executed by one or more processors, cause the one or more processors to:
    receive timing information corresponding to an exchange associated with a first clock and a second clock,
      the first clock being maintained by a first device and corresponding to the second clock, and
      the second clock being maintained by a second device;
    determine, based on the timing information, an offset between the first clock and the second clock;
    synchronize, based on the offset, the first clock with the second clock;
    receive additional timing information corresponding to an exchange associated with the second clock and a third clock,
      the third clock being maintained by the first device and corresponding to the first device;
    determine a timing difference between the first clock and the third clock; and determine a one-way delay, associated with the first device and the second device, based on the additional timing information and the timing difference, the third clock being maintained by the first device and corresponding to the first device.

16. The non-transitory computer-readable medium of claim 15, where the timing information includes information that identifies at least one of:
a time, according to the first clock, at which the first device sends a message to the second device;
a time, according to the second clock, at which the second device receives the message;
a time, according to the second clock, at which the second device sends a response to the message; or
a time, according to the first clock, at which the first device receives the response.

17. The non-transitory computer-readable medium of claim 15, where the one or more instructions, when executed by the one or more processors, further cause the one or more processors to:
determine a first amount of time that identifies a difference between a time, according to the second clock, at which the second device receives a message from the first device, and a time, according to the first clock, at which the first device sends the message to the second device;
determine a second amount of time that identifies a difference between a time, according to the first clock, at which the first device receives a response to the message, and a time, according to the second clock, at which the second device sends the response to the message; and
where the one or more instructions, that cause the one or more processors to determine the offset, cause the one or more processors to:
determine the offset based on a difference between the first amount of time and the second amount of time.

18. The non-transitory computer-readable medium of claim 15, where the one or more instructions, when executed by the one or more processors, further cause the one or more processors to:
determine, based on the offset, correction information associated with correcting the first clock,
the correction information including information associated with increasing or decreasing a speed of the first clock; and
where the one or more instructions, that cause the one or more processors to synchronize the first clock, cause the one or more processors to:
synchronize the first clock based on the correction information.

19. The non-transitory computer-readable medium of claim 15,
where the additional timing information includes information that identifies a time, according to the second clock, at which the second device receives a message from the first device, and a time, according to the third clock, at which the first device sends the message to the second device.

20. The non-transitory computer-readable medium of claim 15,
where the additional timing information includes information that identifies a time, according to the third clock, at which the first device receives a response to a message, and a time, according to the second clock, at which the second device sends the response to the message.

* * * * *